United States Patent
Malkin

(10) Patent No.: US 10,296,222 B2
(45) Date of Patent: May 21, 2019

(54) MAINTAIN DATA IN DIFFERENTLY PERFORMING STORAGE DEVICES

(71) Applicant: Hewlett Packard Enterprise Development LP, Houston, TX (US)

(72) Inventor: Kirill Malkin, Morris Plains, NJ (US)

(73) Assignee: Hewlett Packard Enterprise Development LP, Houston, TX (US)

(*) Notice: Subject to any disclaimer, the term of this patent is extended or adjusted under 35 U.S.C. 154(b) by 140 days.

(21) Appl. No.: 15/339,411

(22) Filed: Oct. 31, 2016

(65) Prior Publication Data

US 2017/0115881 A1    Apr. 27, 2017

Related U.S. Application Data

(63) Continuation of application No. 14/335,752, filed on Jul. 18, 2014, now Pat. No. 9,619,180.

(60) Provisional application No. 61/859,521, filed on Jul. 29, 2013.

(51) Int. Cl.
*G06F 3/00* (2006.01)
*G06F 3/06* (2006.01)

(52) U.S. Cl.
CPC ............ *G06F 3/061* (2013.01); *G06F 3/0619* (2013.01); *G06F 3/0649* (2013.01); *G06F 3/0685* (2013.01); *G06F 3/00* (2013.01)

(58) Field of Classification Search
CPC ...... G06F 3/0685; G06F 3/0619; G06F 3/061; G06F 3/0649
See application file for complete search history.

(56) References Cited

U.S. PATENT DOCUMENTS

| | | |
|---|---|---|
| 6,349,357 B1 | 2/2002 | Chong |
| 8,478,731 B1 | 7/2013 | Throop et al. |
| 8,924,630 B2 | 12/2014 | Cho |
| 8,984,243 B1 | 3/2015 | Chen et al. |
| 9,015,519 B2 | 4/2015 | Anthonisamy et al. |
| 9,213,628 B2 | 12/2015 | Maheshwari et al. |
| 9,280,550 B1 | 3/2016 | Hsu et al. |
| 9,619,180 B2 | 4/2017 | Malkin |
| 9,858,012 B2 * | 1/2018 | Dudas ................. G06F 3/0616 |
| 2008/0288714 A1 | 11/2008 | Salomon |
| 2009/0292861 A1 | 11/2009 | Kanevsky et al. |
| 2010/0122020 A1 | 5/2010 | Sikdar et al. |
| 2010/0199036 A1 | 8/2010 | Siewert et al. |

(Continued)

FOREIGN PATENT DOCUMENTS

| | | |
|---|---|---|
| WO | WO 2012/065265 | 5/2012 |
| WO | WO 2015/017147 | 2/2015 |

OTHER PUBLICATIONS

PCT Application No. PCT/US2014/047305 International Search Report and Written Opinion dated Dec. 17, 2014.

(Continued)

*Primary Examiner* — Tammara R Peyton

(57) ABSTRACT

The present system enables more efficient I/O processing by providing a mechanism for maintaining data within the locality of reference. One or more accelerator modules may be implemented within a solid state storage device (SSD). The accelerator modules form a caching storage tier that can receive, store and reproduce data. The one or more accelerator modules may place data into the SSD or hard disk drives based on parameters associated with the data.

20 Claims, 7 Drawing Sheets

(56) References Cited

U.S. PATENT DOCUMENTS

| | | |
|---|---|---|
| 2012/0117029 A1 | 5/2012 | Gold |
| 2012/0246403 A1 | 9/2012 | McHale |
| 2013/0031308 A1 | 1/2013 | De Spiegeleer et al. |
| 2013/0117286 A1 | 5/2013 | Gallant et al. |
| 2015/0032921 A1 | 1/2015 | Malkin |

OTHER PUBLICATIONS

U.S. Appl. No. 14/335,752 Office Action dated Aug. 14, 2015.
EPO, Extended European Search Report, dated Feb. 24, 2017, Application No. 14832889.1, 8 pages.
International Preliminary Report on Patentability received for PCT Application No. PCT/US2014/047305, dated Feb. 11, 2016, 9 pages.

\* cited by examiner

MAINTAIN DATA IN DIFFERENTLY PERFORMING STORAGE DEVICES

CROSS-REFERENCE TO RELATED APPLICATIONS

This application is a continuation and claims the priority benefit of U.S. patent application Ser. No. 14/335,752 filed Jul. 18, 2014, which claims the priority benefit of U.S. provisional application 61/859,521 filed Jul. 29, 2013, the disclosures of which are incorporated herein by reference.

BACKGROUND

Modern direct-access storage devices fall into two categories: the traditional, rotating hard disk drives (HDDs) and new solid state storage devices (SSDs). While they are presented identically to the OS, they have very different performance characteristics and a magnitude of difference in the cost per gigabyte.

Storage system vendors tend to rely on either rotating or solid state media, creating two corresponding categories of storage systems: HDD-based systems that are characterized by lower performance and lower cost, and SSD-based systems that have significantly higher performance and cost as measured by generally available performance tools.

Most unsophisticated "brute force" performance testing tools create artificial workloads, such as randomly writing 4K blocks across the entire capacity of a storage volume or a file. Although the workload is valid, it hardly represents the behavior of a real-world application.

Real-world computer data relevant to a particular processing task (or application) tend to occur in quasi stable groups or clusters. This phenomenon is called "locality of reference", and it can typically take two forms: spatial and temporal localities. Spatial locality means that the application data is placed closely to one other, such as in a single file, folder or a storage device. Temporal locality is the notion that most of the application data will be accessed within a certain timeframe, such as when the application is being used.

Spatial and temporal localities are often correlated. In other words, an application tends to access a limited data set during a given period of time. The footprint of the data subset representing locality of reference varies depending on the applications and their behavior.

The computer industry broadly relies on the locality of reference phenomenon by deploying various techniques where a subset of active data is placed in a "cache", or a high-speed temporary storage, and stays there until it is evicted by a higher activity workload.

The caches are a standard fixture in modern CPUs where the instructions and data are loaded ("prefetched") from DRAM into high-speed on-chip memory on the first read access and are temporarily stored there upon writes with a subsequent write-back to the DRAM. There is usually more than one cache level, with the highest speed cache being the smallest in capacity and vice versa.

Caching technology is also used in storage systems, though to a more limited extent. Traditional storage caching solutions are based on some type of NVRAM (non-volatile SRAM or DRAM) that is relatively small (512 MB-8 GB), proprietary and expensive. Due to its limited size, the cache can hold only a small fraction (typically less than 0.1%) of storage system data, so the data is frequently and aggressively evicted. Consequently, the use of caching technology in storage systems is generally limited to addressing goals such as guaranteeing data consistency in parity RAID stripes across power loss, coalescing small sequential writes into larger ones to improve write latency, and read-ahead for sequential streams (to load transfer pipeline).

What is needed is a mechanism for efficient handling of storage I/O based on storage devices with mixed types.

SUMMARY

Figure 1:
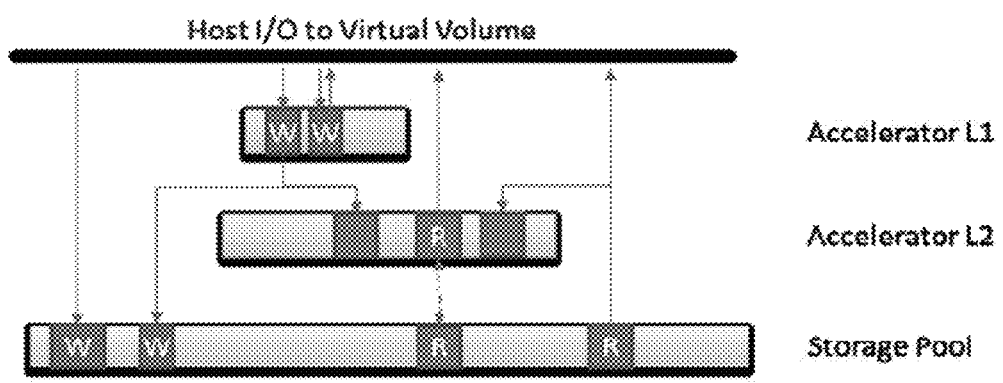
FIG. 1 is a block diagram illustrating accelerator tiers.

The present system enables more efficient I/O processing by providing a mechanism for maintaining data within the locality of reference. One or more accelerator modules may be implemented within a solid state storage device (SSD). The accelerator modules form caching storage tiers that can receive, store and reproduce data. The one or more accelerator modules may place data into the SSD or hard disk drives based on parameters associated with the data.

A method for maintaining data in a storage system may include organizing storage devices of different types into groups based on technology type and performance. Groups with low random IOPS and high throughput may be selected for a storage pool tier. Groups with high random IOPS but lower throughput may be selected for I/O accelerator tier. Copies of data segments may be maintained in a plurality of accelerator tiers.

A method for improving I/O performance may include assigning at least one first storage system as a storage pool, wherein the at least one first storage system is of at least one first storage type. At least one second storage system may be assigned as one or more accelerator tiers for the storage pool. The at least one second storage system may be of at least one second storage type different from the at least one first storage type. The at least one first storage type may be chosen based on one or more first characteristics preferable to the at least one second storage type. The at least one second storage type may be chosen based on one or more second characteristics preferable to the at least one first storage type.

A computer system may include memory, one or more processors and an application. The application may be stored in memory and executable by the one or more processors to organize storage devices of different types into groups based on technology type and performance, select groups with low random IOPS and high throughput for a storage pool tier, select groups with high random IOPS but lower throughput for I/O accelerator tier, and maintain copies of data segments in a plurality of accelerator tiers.

A computer system may include memory, one or more processors and an application. The application may be stored in memory and executable by the one or more processors to assign at least one first storage system as a storage pool, wherein the at least one first storage system is of at least one first storage type, and assign at least one second storage system as one or more accelerator tiers for the storage pool, wherein the at least one second storage system is of at least one second storage type different from the at least one first storage type, the at least one first storage type is chosen based on one or more first characteristics preferable to the at least one second storage type, and the at least one second storage type is chosen based on one or more second characteristics preferable to the at least one first storage type.

DETAILED DESCRIPTION

The present system enables more efficient I/O processing by providing a mechanism for maintaining data within the locality of reference. One or more accelerator modules may be implemented within a solid state storage device (SSD). The accelerator modules form caching storage tiers that can receive, store and reproduce data. The one or more accelerator modules may place data into the SSD or hard disk drives based on parameters associated with the data.

Solid-state storage devices can be thought of as non-volatile memory (an increasing number of SSD models are fast enough), and can be used as a cache. Since they can also store data for a prolonged period of time without power and are sufficiently large, they could simultaneously serve as a temporary storage tier where the data can stay for a long period of time as compared to traditional caching solutions (such as battery-backed SRAM). Note that although there are different technologies of SSDs, for purposes of the present technology, and particularly with respect to comparisons with HDDs, the different SSD technologies are herein treated as fungible within the overall SSD group.

Combining the functions of data cache and data storage devices into one storage tier conceptually transcends the existing methods of storage caching or storage tiering as a means of improving I/O performance of a storage system. The traditional caching schemes are no longer effective with the present technology as the data could accumulate in large quantities without needing to be evicted for an observable period of time (e.g., initially the entire workload could fit into the fastest available tier). Since the application data could simultaneously reside on multiple storage tiers with different performance characteristics, the traditional tiering methods are not applicable either.

The present technology combines the sharing of data cache and storage inside a single storage tier, and utilizes an I/O accelerator. The I/O accelerator maintains the data within a locality of reference inside the accelerator. In some instances, the present technology also assumes the footprint of the data subset representing locality of reference is on average about 5% of the total capacity of the system.

This concept can be also regarded as a dynamic vertical tiering, where data is not placed exclusively on a particular tier, but is simultaneously and dynamically present on multiple levels of acceleration.

FIG. 1 is a block diagram illustrating accelerator tiers. FIG. 1 illustrates multiple accelerators and a storage pool of HDDs handling data. A first accelerator may handle writes and may pass the data to a storage pool. A second tier of accelerator may handle reads and pass the data to the storage pool as well. If the capacity of data residing in the fastest storage tier matches or exceeds the footprint of the application's locality of reference, then from the application standpoint the performance of such storage system will be as good as the performance of the fastest storage tier. Effectively, this can make an HDD-based storage system appear to an application as an all-SSD system using the SSD to store only about 5% of the HDD storage. With cost of SSDs continuing to stay a magnitude higher than HDDs, this approach enables significant cost savings.

Based on the above analysis, it is beneficial to construct a storage system that utilizes HDDs as a storage tier and SSDs as one or more acceleration tiers, therefore significantly improving performance of the applications residing on such storage system without resorting to an expensive all-SSD option.

It is assumed that the underlying storage pool delivers a commonly acceptable level of redundancy (e.g., n-way mirror, single parity, double parity, erasure coding, non-erasure coding, etc.), so that the data is reasonably protected from a failure of one or more storage devices. If the data is present in one or more of the accelerator tiers and has not been copied to the storage pool, at least one accelerator tier must deliver a similar or better redundancy level than the storage pool.

The concept of I/O acceleration can be extended to encompass multiple, and possibly nested, reference localities as well as multiple storage accelerators based on storage tiers with varied performance, working together to accelerate the I/O processing in a storage system. In this case, the fastest tier would keep the small, but active data sets while slower tiers will contain increasingly larger data sets, with one or more final (slowest) tiers collectively spanning the entire capacity in use by applications. Not all tiers will simultaneously cache and store data, but they can all be driven by unified acceleration schemes, therefore simplifying the design. An example of multiple acceleration tiers includes for example, four accelerator tiers from fastest to slowest, using, respectively, NVRAM (e.g., non-volatile SRAM or DRAM), DRAM (Dynamic Random Access Memory), SLC (single-level cell SSD technology), SSDs (solid state storage devices, MLC (multi-level cell SSD technology) SSDs and HDDs (hard disk drives), as part of a single storage system serving data to applications.

HDDs may perform best on large, sequential I/O requests. This is based on the mechanical design of the HDDs and resulting latency. Typical random I/O performance is only around 200-400 IOPS (Input/Output operations Per Second) for an HDD (relatively flat on request sizes up to 128 KB), while it is possible to see data transfer rates upwards of 140 MB/s for large, sequential I/O.

Solid-state Storage Devices (SSDs) have no moving mechanical parts and perform equally well with both random and sequential I/O patterns. Modern SSDs deliver 20,000-70,000 IOPS on random 4K access. SSDs however suffer from write amplification, accumulating wear and data retention issues. These are largely addressed in latest SSD models, although they require internal NAND over-provisioning, implementation of the SCSI UNMAP command and wear leveling algorithms. The UNMAP command tells the storage device that a certain block range is no longer being used by the application (such as when a large file is deleted or a volume is formatted). While it has virtually no use for HDD, modern SSD technologies rely heavily on it to begin a lengthy process of erasing cells to proactively mitigate the effects of "write amplification" (the need to erase before writing) on performance. The impact of all these issues is proportional to the overall I/O volume directed to the SSD. In other words, relatively smaller I/O requests (random or not) are "easier" on SSDs than relatively larger ones.

Figure 2:
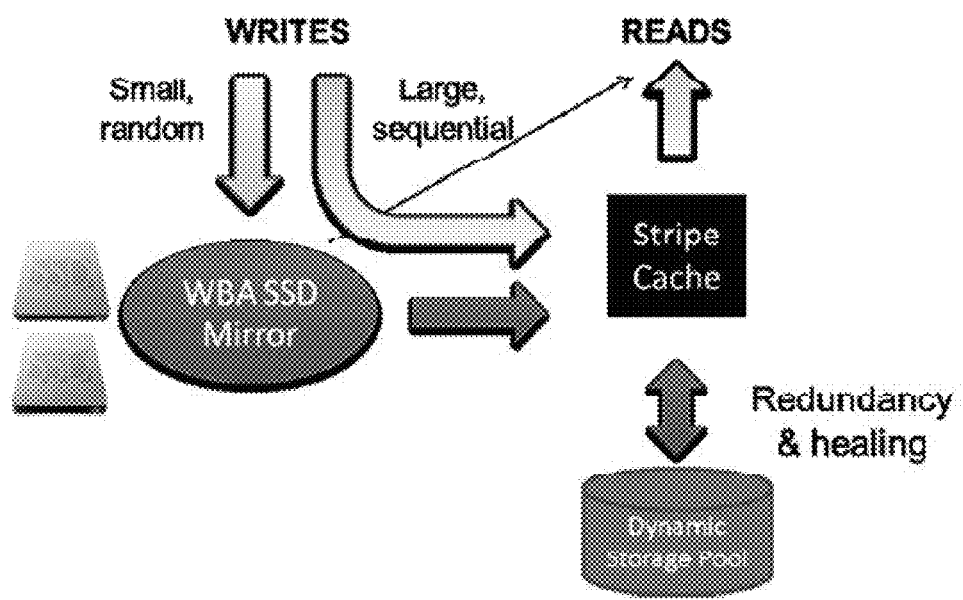
FIG. 2 is a block diagram illustrating reactive I/O acceleration.

Data can be placed into the accelerator based on a just-in-time decision when a write I/O comes across. This type of acceleration can be regarded as "a posteriori", or reactive. FIG. 2 is a block diagram illustrating reactive I/O acceleration. It is best applied to write requests as the data hasn't been stored anywhere yet. Although such acceleration is write-oriented, it indirectly helps read I/O by allowing more bandwidth for it. Additionally, read requests for the data that had just been placed in accelerator will be serviced from the accelerator, supporting the locality of reference.

The following write-oriented (or "writeback") I/O accelerator design takes advantage of the differences between SSDs and HDDs by separating the incoming virtual volume I/O according to request parameters (size, location, presence in cache).

The design generally attempts to forward smaller write requests to SSD, while large write requests (equal or greater than a predetermined size for a particular underlying storage layout) are forwarded to the virtualized (pooled) HDDs. As the data segments stored on the SSD coalesce into large enough, predetermined contiguous spans (e.g., hundreds of sectors) exceeding the above separation criteria, they can be optionally copied (flushed) into the HDD pool by a "lazy writer" process. A separation criterion is basically the size of the request, but could involve other factors, for example, several sequential requests could be combined and regarded as a single large one. Given the relatively large capacity of SSDs (hundreds of GBs), there is little pressure for flushing, and it could be delayed by minutes or even hours and days.

Figure 3:
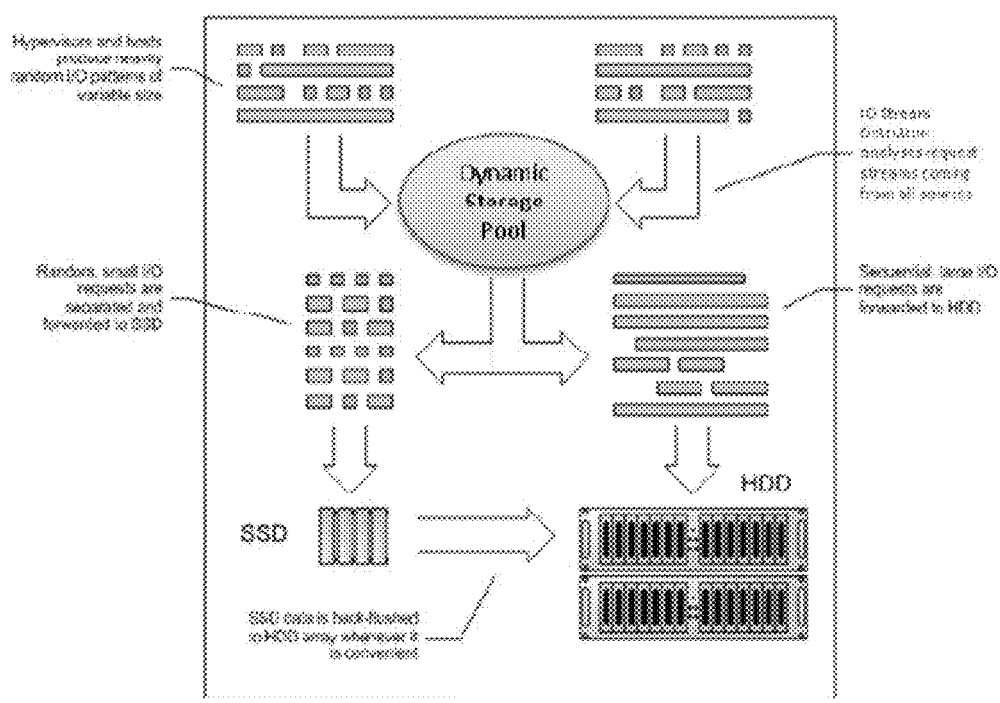
FIG. 3 is a block diagram illustrating request separation.

FIG. 3 is a block diagram illustrating request separation. In effect, this design uses the bandwidth and capacity of SSDs for processing of relatively small random requests that would challenge an HDD-based storage pool. At the same time, it bypasses the SSDs for large sequential requests that are most adequate for the HDDs, but could trigger write amplification on and wear out the SSDs. Among other benefits, this improves the performance of the SSD tier, extends its life and enables the use of SSDs with lesser program-erase (PE) cycles guarantee since they only need to absorb a subset of I/O containing relatively small data segments.

The SSD tier used for the above purpose may satisfy the following requirements:
  It must be redundant (e.g., mirror, single parity, etc.)
  It must ensure that writes reported as complete are guaranteed to be complete upon sudden power loss;
  It should perform well on writes (tens of thousands of IOPS).

The write requests are stored in a data area controlled using a conventional data space allocation method. For each request, one or more data segments are allocated. As the lazy writer copies the requests back to the HDD pool, the space can be optionally released making way for new data segments.

The mapping between the logical blocks of a virtual volume and the segments stored in the writeback accelerator is kept in a binary tree that could be either in-memory (DRAM) or loadable on demand (B+ tree). Prior to the completion of write requests, new and modified tree entries are recorded into an additional circular journal index ("writeback journal") also located on the SSD. This is necessary to reconstruct the binary tree after a failover or power loss. During the recovery, the journal is read only once as the tree is rebuilt.

If a data segment of a volume is already stored in the writeback accelerator, subsequent write requests require no new allocation and the requests are directed to the same writeback data area that's already been mapped. This reduces allocation overhead when the same set of blocks is written repeatedly. There are a few exceptions to this rule, e.g., in presence of snapshots and compressed data. With snapshots, the same data segment can be referenced from more than one virtual volume, so when one volume is overwritten, the data segment needs to be preserved to facilitate the other volume. When the data is compressed, it can't be partially modified as it needs to be decompressed, updated and then compressed again, likely altering the compressed length.

Due to the locality of reference and depending on the workload specifics, the data segments stored in the writeback accelerator are expected to combine into contiguous spans of various lengths due to effects of spatial locality. The spans are assembled in groups depending on their length. For example, there may be 4 groups, starting below 256 KB, from 256 K to 4 MB, from 4 MB to 8 MB, and more than 8 MB. The lazy writer attempts to select the spans from the longest groups for copying to HDD pool to capitalize on the efficiency of sequential I/O for HDDs.

Sending large requests to the HDD pool has the additional benefit of avoiding read-modify-write cycles on RAID-based and especially transaction-based (redirect on write) pools. If the request fully covers the pool stripe, there is no need for a costly "read before write" operation (i.e., reading previous stripe data to populate parts of stripe that is not covered by accelerator segment, augmenting it with the data from the accelerator segment, and writing the full stripe out) impacting the performance. The entire stripe is written out and the old stripe (if any) can be simply released.

Figure 4:
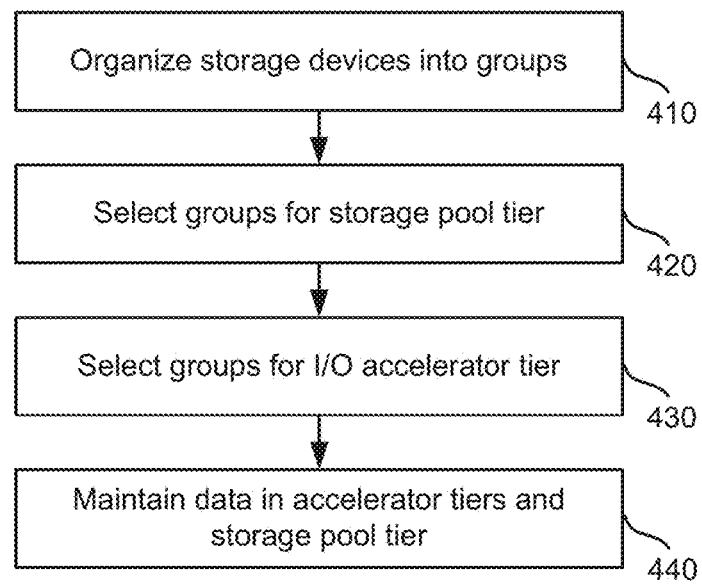
FIG. 4 is a method for improving I/O performance in a storage system.

FIG. 4 is a method for improving I/O performance in a storage system. Storage devices are organized into groups at step 410. The group may depend on technology type and performance of the particular drive. Groups for storage pool tier are selected at step 420. In particular, groups with a low random IOPS but high throughput may be selected for the storage pool tier. The "low" and "high" may be relative and predetermined by an administrator based on design preference. Groups may be selected for the I/O accelerator tier at step 430. Groups selected for the accelerator tier may have high random IOPS but lower throughput. Finally, data in the accelerator tiers and storage pool tiers may be maintained at step 440. If the segments are not in the storage pool, at least one accelerator tier maintains the redundancy level matching or exceeding the redundancy level of the storage pool.

The writeback accelerator capacity is flexible and can be increased essentially by adding more data space and growing the journal index. It is helpful when the area of reference increases as a consequence of adding new workloads. That way, the performance of the storage system can be readily improved with "plug and play" simplicity and without needing a "forklift" upgrade (i.e., replacing the entire system hardware) or unnecessarily growing the HDD pool capacity just to add more spindles to increase the performance.

The reactive acceleration works well for write requests by building up the locality of reference in the accelerator. Improving the performance of read requests calls for "a priori" knowledge of where the future requests will be placed and proactively moving corresponding data segments to the accelerator.

Since the data being requested from the storage system were previously written there, it means at some point they were present in the memory of the storage system. This creates an opportunity for a proactive storing of the qualified data segments in an accelerator, sometime after they have been written by the host. Alternatively, the data that was just read and transmitted to the host can linger in memory until the memory must be reallocated for other needs.

In other words, the segments can be first retained in memory and then optionally copied into the SSD accelerator tier instead of being simply discarded. This tier doesn't need to be redundant as it contains a copy of data already present in a storage tier (HDD pool). A failure to read from the accelerator will result in redirecting the read request to the pool. The process of migrating data segments from memory to SSD accelerator tier can be thought as "spilling over" of excessive segments from memory to the SSD, so we will refer to this design as the "spillover accelerator".

When the data segments pass through memory, whether during initial write or subsequent reads, they are considered for placement in the accelerator and copied there if they meet the criteria for acceleration. To make this determination, the accelerator logic must dynamically track and update the statistics of various logical block spans of the virtual volume. The statistics become part of metadata and persist across reboots and failovers. The statistics contribute to calculating the "quality level" of a data segment (or collection thereof) that is later compared to a series of thresholds to make the determination. For example, the number of accesses to a data segment could be counted, and any segment with more than three accesses will be copied into the accelerator.

The quality level could be calculated using any of a variety of methods. They should generally follow the same locality of reference ideas as for reactive I/O acceleration. In other words, the methods used should elevate the quality of random data segments determined to be small, that are accessed within a certain timeframe and lower the quality of segments accessed as long contiguous data streams. This will result in proactive copying of small randomly accessed segments into accelerators. In presence of multiple accelerator tiers, criteria and thresholds will be different for each tier, but the above process remains fundamentally the same. The criteria could include, for example, the number of references to a particular data segment across virtualized storage. The more references there are to a segment, the higher is the quality of the segment, all other parameters being equal. Thresholds would be steeper for smaller and faster accelerators, and to get into them, the data segments should be relatively smaller and/or accessed within a relatively narrower time frame.

For storage systems based on a dynamic storage pool, it is often optimal to store data segments that match the pool layout stripe size. As the stripes are usually a magnitude or two larger than the storage device block size, this can also significantly reduce the metadata overhead of the accelerator. Prior to copying to an accelerator SSD, the stripes are held in memory and optionally compressed. Since the compression and copy occur outside of the host data path, they do not directly add to the latency of the host I/O. The diagram below (FIG. 5) shows the elements of proactive I/O acceleration.

Figure 5:
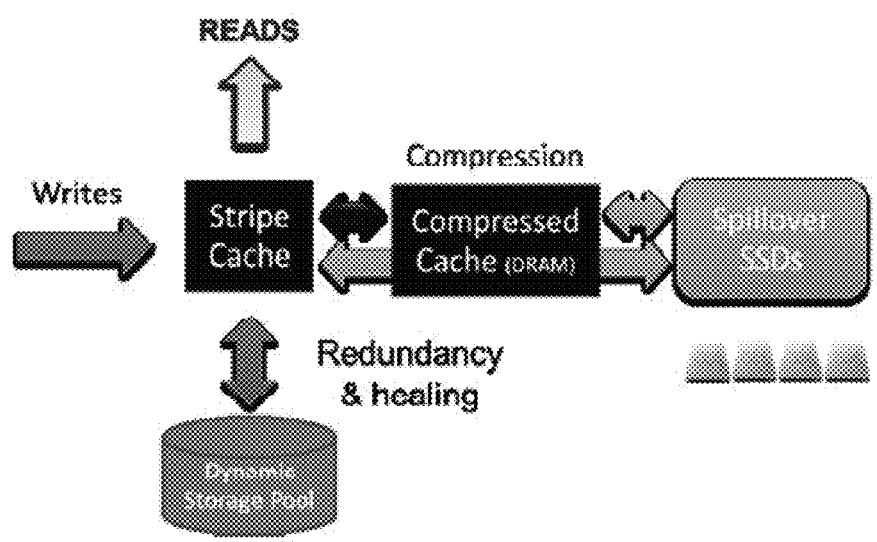
FIG. 5 is a block diagram illustrating proactive I/O acceleration.

FIG. 5 is a block diagram illustrating proactive I/O acceleration. Here "compression" can be either compression or decompression, depending on the direction of I/O. While compression and decompression add a performance hit, it is typically much less than the time it takes to bring the data from HDD (and even SSD), particularly in software-defined architectures, such as x86_64 where the CPUs are exceptionally fast and multi-threaded. In other words, the benefits outweigh the minor performance hit. The accelerator data (both compressed and uncompressed) are stored in a data area of the spillover accelerator tier controlled by a data space allocation algorithm. For each data segment (e.g., pool stripe), the accelerator may allocate multiple contiguous spans.

The mapping between the stripes of a storage pool and the data segments stored in the spillover accelerator is kept in a binary tree that could be either in-memory or loadable on demand (B+ tree). New and modified tree entries are recorded into a journal index ("spillover journal") also located on the redundant SSD. This is necessary to reconstruct the binary tree after a failover or power loss. During the recovery, the journal is read only once as the tree is rebuilt. The entries are added to the journal after their data segments are successfully copied to the accelerator data area. It is critical that the entries are reliably updated or invalidated when the data is no longer current, such as when the corresponding area of the virtual volume is overwritten or unmapped.

Figure 6:
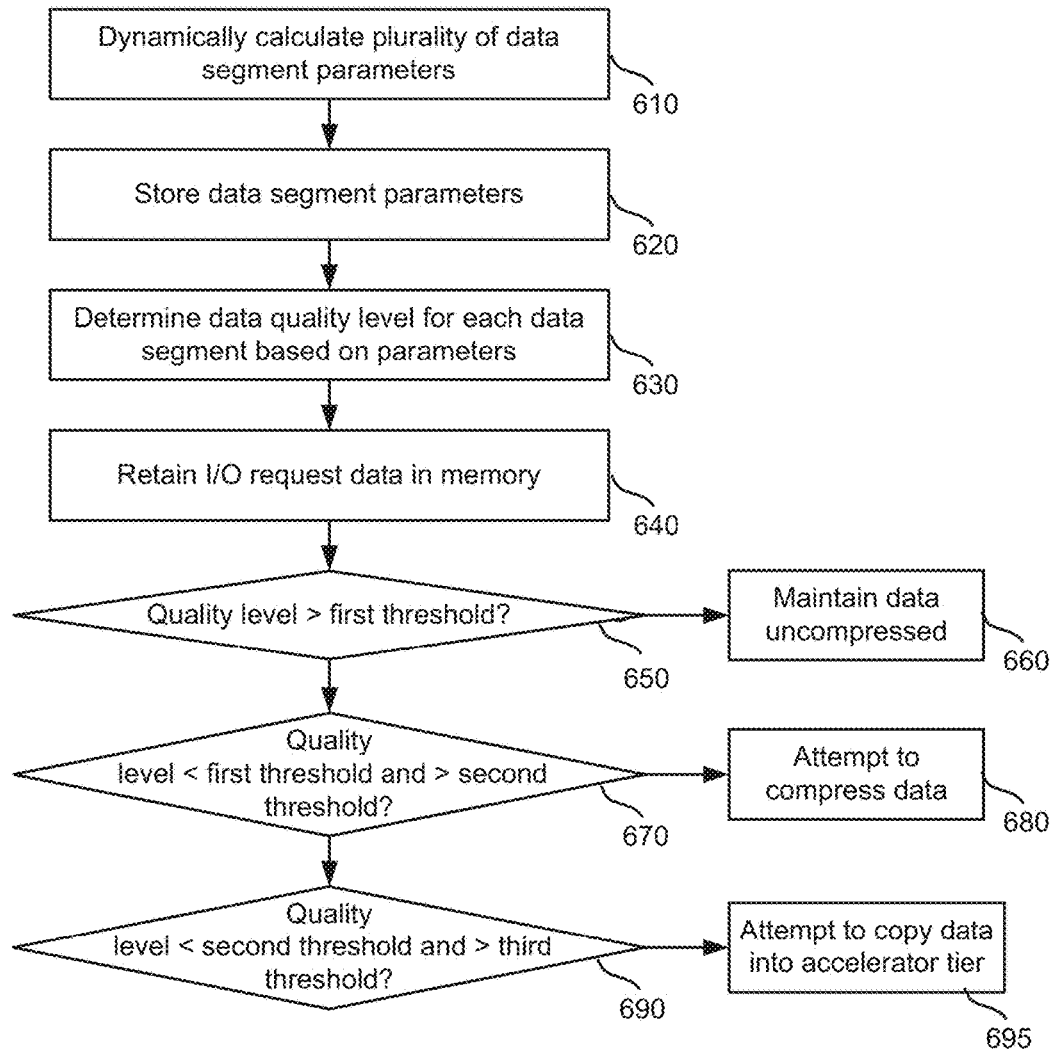
FIG. 6 is a method for providing proactive I/O acceleration.

FIG. 6 is a method for providing proactive I/O acceleration. A plurality of data segment parameters is dynamically calculated at step 610. The calculated parameters may be stored in metadata that may persist across storage system reboots and failovers. The data segment parameters may be stored at step 620.

A data quality level may be determined for each data segment at step 630. The data quality level may be determined based on the parameters. I/O request data are retained in memory after the I/O operation is complete at step 640. A determination is made as to whether the quality level for the I/O request is greater than a first threshold at step 650. If the quality level is greater than the first threshold, the data is maintained uncompressed at step 660.

If the quality level is not greater than the first threshold, a determination is made as to whether the quality level is less than the first threshold but greater than a second threshold at step 670. If so, an attempt is made to compress the data at step 680. If the compression is successful, only the compressed version is maintained. If the compression is not successful, the uncompressed version is maintained.

If the quality level is below the second threshold but exceeds a third threshold, an attempt is made to copy the data into an accelerator tier 690. If successful, the data is maintained in the accelerator tier 695. If the copy is not successful, the data is maintained in the storage pool.

Figure 7:
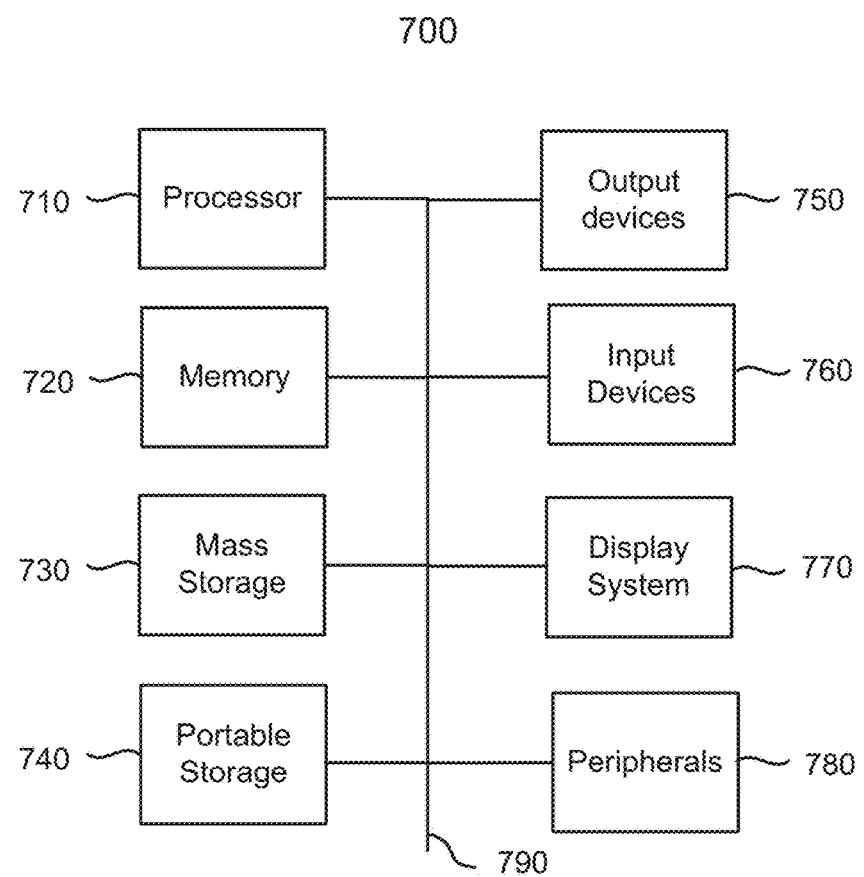
FIG. 7 is a block diagram of a computing environment for use in the present technology.

FIG. 7 is a block diagram of a computing environment for use in the present technology. System 700 of FIG. 7 may be implemented in the contexts of the likes of a server or other computing device that may provide one or more SDDs, HDDs, or other storage components suitable for implementing the present technology. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses 790.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, memory card, USB memory stick, or on-board memory to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, cursor direction keys, or touch panel. Additionally, the system 700 as shown in FIG. 7 includes output devices 750. Examples of suitable output devices include speakers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 740 may include a modem or a router, network interface, or USB interface.

In some embodiments, the system of FIG. 7 may implement a mobile device, such as for example a smart phone. In this case, the system may include additional components, such as for example one or more antennas, radios, and other wireless communication equipment, microphones, and other components.

A system antenna may include one or more antennas for communicating wirelessly with another device. Antenna may be used, for example, to communicate wirelessly via Wi-Fi, Bluetooth, with a cellular network, or with other wireless protocols and systems. The one or more antennas may be controlled by a processor, which may include a controller, to transmit and receive wireless signals. For example, a processor may execute programs stored in memory to control antenna to transmit a wireless signal to a cellular network and receive a wireless signal from a cellular network.

Microphone may include one or more microphone devices which transmit captured acoustic signals to processor and memory. The acoustic signals may be processed to transmit over a network via antenna.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for maintaining data in a storage system, the method comprising:
   receiving a first request to write data to the data storage system;
   identifying that a size associated with the first write request is smaller than a threshold size;
   writing data associated with the first write request to a first storage device based on the size of the first write request being below the threshold size;
   receiving one or more additional requests to write data to the data storage system, wherein each of the one or more additional write requests to the data storage system are written to the first storage device;
   identifying that the first write request and the one or more additional write requests span a contiguous portion of the first storage device that corresponds to a separation criteria size, wherein the separation criteria size corresponds to a number of sectors at the first storage device; and
   writing data from the contiguous portion of the first storage device that correspond to the separation criteria size to one or more second storage devices based on the identification that the first write request and the one or more additional write requests spans the contiguous portion of the first storage device, the first storage device having a higher performance than the one or more second storage devices.

2. The method of claim 1, further comprising:
   receiving a new write request;
   identifying that a size of the new write request is larger than the threshold size; and
   writing data from the new write request to the one or more second storage devices based on the identification that the size of the new write request is larger than the threshold size.

3. The method of claim 1, wherein the threshold size and the separation criteria size are equal.

4. The method of claim 1, wherein the threshold size is set by an administrator of the data storage system.

5. The method of claim 1, wherein the data written to the one or more second storage devices are striped across a plurality of second storage devices.

6. The method of claim 1, wherein the data associated with the first write request are redundantly stored.

7. The method of claim 1, further comprising:
   receiving a second write request before receiving the one or more additional write requests;
   identifying that the second write request corresponds to one or more locations associated with the first write request; and
   writing data associated with the second write request to the first storage device.

8. A non-transitory computer readable storage medium having embodied thereon a program, that when executed by a processor cause the processor to:
   receive a first request to write data to a data storage system;
   identify that a size associated with the first write request is smaller than a threshold size;

write data associated with the first write request to a first storage device based on the size of the first write request being below the threshold size;

receive one or more additional requests to write data to the data storage system, wherein each of the one or more additional write requests to the data storage system are written to the first storage device;

identify that the first write request and the one or more additional write requests span a contiguous portion of the first storage device that corresponds to a separation criteria size, wherein the separation criteria size corresponds to a number of sectors at the first storage device; and write data from the contiguous portion of the first storage device that correspond to the separation criteria size to one or more second storage devices based on the identification that the first write request and the one or more additional write requests spans the contiguous portion of the first storage device, the first storage device having a lower random IOPS and a higher throughput than each of the one or more second storage devices.

9. The non-transitory computer readable storage medium of claim 8, the program further to cause the processor to:

receive a new write request;

identify that a size of the new write request is larger than the threshold size; and write data from the new write request to the one or more second storage devices based on the identification that the size of the new write request is larger than the threshold size.

10. The non-transitory computer readable storage medium of claim 8, wherein the threshold size and the separation criteria size are equal.

11. The non-transitory computer readable storage medium of claim 8, wherein the threshold size is set by an administrator of the data storage system.

12. The non-transitory computer readable storage medium of claim 8, wherein the data written to the one or more second storage devices are striped across a plurality of second storage devices.

13. The non-transitory computer readable storage medium of claim 8, wherein the data associated with the first write request are redundantly stored.

14. The non-transitory computer readable storage medium of claim 8, the program further executable to:

receive a second write request before receiving the one or more additional write requests;

identify that the second write request corresponds to one or more locations associated with the first write request; and write data associated with the second write request to the first storage device.

15. A data storage system for maintaining data in a storage system, the data storage system comprising:

a memory;

a processor that executes instructions out of the memory;

a plurality of first storage devices;

a plurality of second storage devices, the first storage devices having a first characteristic that is preferable to the second storage devices and the second storage devices having a second characteristic that is preferable to the first storage devices; and an interface that receives a first request to write data to the data storage system, wherein the processor is to execute instructions out of the memory:

identify that a size associated with the first write request is smaller than a threshold size, write data associated with the first write request to a first storage device of the plurality of first storage devices based on the size of the first write request being below the threshold size, wherein the interface receives one or more additional requests to write data to the data storage system, and each of the one or more additional write requests to the data storage system are written to the first storage device of the plurality of first storage devices, identify that the first write request and the one or more additional write requests span a contiguous portion of the first storage device that corresponds to a separation criteria size, wherein the separation criteria size corresponds to a number of sectors at the first storage device, and write data from the contiguous portion of the first storage device that correspond to the separation criteria size to one or more second storage devices of the plurality of second storage devices based on the identification that the first write request and the one or more additional write requests spans the contiguous portion of the first storage device.

16. The system of claim 15, wherein:

a new write request is received;

a size of the new write request is identified as being larger than the threshold size; and wherein the processor is to write data from the new write request to the one or more second storage devices of the plurality of second storage devices is based on the identification that the size of the new write request is larger than the threshold size.

17. The system of claim 15, wherein the threshold size and the separation criteria size are equal.

18. The system of claim 15, wherein the threshold size is set by an administrator of the data storage system.

19. The method of claim 15, wherein the data written to the one or more second storage devices are striped across a plurality of second storage devices.

20. The method of claim 15, wherein the data associated with the first write request are redundantly stored.

* * * * *